United States Patent [19]

Rayford et al.

[11] 4,237,271

[45] Dec. 2, 1980

[54] CROSSLINKED STARCH HALOHYDRINS AND THEIR NITROGEN-CONTAINING SUBSTITUTION PRODUCTS

[75] Inventors: Warren E. Rayford; Robert E. Wing, both of Peoria, Ill.

[73] Assignee: The United States of America as represented by the Secretary of Agriculture, Washington, D.C.

[21] Appl. No.: 32,850

[22] Filed: Apr. 24, 1979

[51] Int. Cl.$^3$ .................. C08B 31/00; C08B 33/00
[52] U.S. Cl. ............................... 536/47; 536/50; 536/106; 536/111
[58] Field of Search ................ 536/47, 106, 50, 111

[56] References Cited

U.S. PATENT DOCUMENTS

| | | | |
|---|---|---|---|
| 2,813,093 | 11/1957 | Caldwell et al. | 536/47 |
| 2,876,217 | 3/1959 | Paschall | 536/47 |
| 2,995,513 | 8/1961 | Paschall et al. | 536/47 |
| 3,062,810 | 11/1962 | Hjermstad et al. | 536/11 |
| 3,065,222 | 11/1962 | Bullock et al. | 536/47 |
| 3,243,426 | 3/1966 | Caesar | 536/47 |
| 3,277,025 | 10/1966 | Flodin et al. | 536/47 |
| 3,346,563 | 10/1967 | Shildneck et al. | 536/47 |
| 3,414,550 | 12/1968 | D'Alelio | 536/47 |
| 3,422,087 | 1/1969 | Caesar | 536/47 |
| 3,715,339 | 2/1973 | Rainer | 260/29.2 R |
| 3,770,472 | 11/1973 | Jarowenko | 536/111 |
| 3,804,828 | 4/1974 | Szymanski et al. | 536/106 |
| 3,842,005 | 10/1974 | Moser et al. | 210/47 |
| 4,015,316 | 9/1977 | Wing | 536/107 |

OTHER PUBLICATIONS

Hamerstrand et al. Cereal Chemistry, vol. 37, pp. 519 to 524 (1960).

Whistler et al., Starch:Chemistry and Technology, pp. --front and 482 (1965) vol. 1.

Trimnell et al. "Preparation of Starch 2-Hydroxy-3-Mercaptopropyl Ethers and Their Use in Graft Polymerizations," J. Appl. Poly. Sci., vol. 22, pp. 3579–3586 (1978).

Wing et al. "Preparation of Insoluble Cationic Starches and Their Use in Heavy Metal Anion Removal," J. Appl. Poly-Sci. vol. 22, pp. 1405–1416 (1978).

*Primary Examiner*—Melvyn I. Marquis
*Attorney, Agent, or Firm*—M. Howard Silverstein; David G. McConnell; Curtis P. Ribando

[57] ABSTRACT

Crosslinked starch is reacted with an epihalohydrin in the presence of a strong acid catalyst to produce the 3-halo-2-hydroxypropyl ether. Substitution of the halogen with nitrogen-containing compounds enables the preparation of novel water-insoluble cationic, anionic, and chelating starch ethers, as well as starch ethers having degrees of substitution heretofore unattainable in the prior art.

13 Claims, No Drawings

CROSSLINKED STARCH HALOHYDRINS AND THEIR NITROGEN-CONTAINING SUBSTITUTION PRODUCTS

BACKGROUND OF THE INVENTION

1. Field of the Invention

Our invention relates to the preparation of halogenated starch ethers and to water-insoluble, nitrogen-containing substitution products thereof which are useful as anionic, cationic, or chelating complexing agents.

2. Description of the Prior Art

Derivatized starches containing nitrogen functionalities have long been the subject of extensive investigation. Cationic tertiary and quaternary ammonium starch ethers have been utilized for floculating materials suspended in aqueous systems including anionic starches, celluloses, clays, ores, silt, coal, and the like. They have also found use in papermaking as filler and pigment retention aids, sizing agents, and strengthening agents.

The effectiveness of these agents is generally related to their solubility and the degree of substitution (D.S.) of the cationic functionality. These properties are determined to a large extent upon the procedure for etherification as well as the degree of gelatinization and crosslinking of the starch moiety prior to and during derivatization. One of the predominant etherification mechanisms as taught in Paschall, U.S. Pat. No. 2,876,217, involves reacting an amine with an epihalohydrin to form an intermediate reaction product, which can be etherified with granular starch under strongly alkaline conditions. Paschall teaches that unless precautions are taken, the starch will be crosslinked by residual epihalohydrin, resulting in an ungelatinizable product which is considered undesirable of his prospective uses. The highest D.S. taught by Paschall is 0.065. In U.S. Pat. No. 2,995,513, Paschall discloses products having higher D.S.'s and improved flocculating capacities obtained by gelatinizing prior to etherification.

In U.S. Pat. No. 3,243,426 and 3,422,087, Caesar prepares gelatinizable cationic starches by essentially the same route as Paschall. He additionally teaches that gelatinization during etherification can be avoided by conducting this step in the absence of an aqueous medium.

By a slightly different mechanism, Shildneck (U.S. Pat. No. 3,346,563) prepares cationic starches via an intermediate reaction product of an amine and an allyl halide. The reactant starch may be either granular or gelatinized, and the conditions of his process are selected to minimize crosslinking. In an improvement over Shildneck et al., Moser et al., U.S. Pat. No. 3,842,005, teaches that gelatinized, noncrosslinked quaternary ammonium starch ethers having D.S. as high as 1.07 can be prepared by employing allyl quaternary ammonium halides which are essentially free from excess allyl halide and allyl alcohol.

In the preparation of a cation exchange starch, Bullock et al. (U.S. Pat. No. 3,065,222) prepares a water-insoluble granular product by crosslinking the starch prior to reacting it with either monochloroacetic acid or 2-chlorotriethylamine.

There are many applications for nitrogen-containing starch ethers, such as in the flocculation and removal of anions from wastewaters, which require that the product be insoluble (i.e., ungelatinizable) in aqueous solutions and simultaneously have a high D.S. It would also be desirable to prepare starch ethers having chelating or anionic reactant groups for the removal of heavy metals and other cations from solution. The etherification procedures heretofore known in the prior art as discussed above preclude the formation of many of these products.

SUMMARY OF THE INVENTION

We have now surprisingly discovered a novel method of preparing water-insoluble, ungelatinized, nitrogen-containing starch ethers having a high degree of substitution via a novel halogenated starch ether intermediate. The method comprises the following steps:

a. reacting a granular, crosslinked starch with an epihalohydrin in the presence of a strong acid catalyst in order to produce the 3-halo-2-hydroxypropyl ether;

b. reacting the ether prepared in step (a) with a nitrogen-containing compound, wherein the nitrogen functionality of the compound is reacted at the site of halogenation in order to produce the nitrogen-containing starch ether; and c. recovering the nitrogen-containing starch ether prepared in step (b).

In accordance with this discovery, it is an object of the invention to prepare the novel 3-halo-2-hydroxypropyl starch ether intermediate compound.

It is also an object of the invention to prepare a starch ether intermediate compound having a relatively high degree of substitution of reactive halogen functionality.

Another object of the invention is to react with the starch ether intermediates with diverse species of nitrogen-containing compounds in the preparation of novel, water-insoluble, nitrogen-containing starch ethers useful as anionic, cationic, or chelating complexing agents.

A further object of the invention is to prepare water-insoluble nitrogen-containing starch ethers having degrees of substitution heretofore unattainable in the prior art.

Other objects and advantages of this invention will become readily apparent from the ensuing description.

DETAILED DESCRIPTION OF THE INVENTION

Crosslinked-starch starting materials for use in the invention include granular (ungelatinized) starches which have been crosslinked by any conventional crosslinking agent to the extent that they remain ungelatinizable under the conditions of etherification as described below. Exemplary crosslinking agents include epichlorohydrin, phosphorous oxychloride, sodium trimetaphosphate, anhydrides of dicarboxylic acids, acrolein, formaldehyde, glyoxal, and N-methylolureas. These agents interconnect the starch molecules by forming crosslinks between the hydroxyl oxygens of the respective molecules. For example, starch crosslinked with epichlorohydrin under base catalyzed conditions would be characterized by the following general structure:

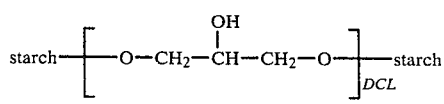

wherein DCL equals the degree of crosslinking and the oxygens within the brackets are from the starch hydroxyls. The degree of crosslinking must be such that sufficient reactive sites are available for etherification and such that the etherified product is substantially insoluble in aqueous solutions. To be insoluble, it must remain substantially ungelatinized.

The novel 3-halo-2-hydroxypropyl crosslinked starch (HHCS) intermediate compositions of this invention are prepared by etherifying the crosslinked starch with an epihalohydrin under acid catalyzed conditions. Epichlorohydrin is the preferred etherification agent, though it is understood that the bromo or iodo analog could be substituted as a substantial equivalent. Perchloric acid has proven to be an effective catalyst for the etherification, though it is envisioned that other strong acids, such as hydrochloric, sulfuric, boron trifluoride, and mixtures thereof could also be employed.

The epihalohydrin serves as the reaction medium, and therefore an amount in excess of the desired reaction ratio is generally desired in order to facilitate stirring. A satisfactory molar ratio of epihalohydrin:starch anhydroglucose unit (AGU) is in the range of about 3:1 to about 6:1, which for epichlorohydrin corresponds to a weight ratio in the range of about 3:2 to about 3:1.

The moisture content of the starch is critical to ether formation. The water is necessary to effect protonation of the acid catalyst. Maximum etherification and reaction rate occur at moisture contents in the range of 9–15% based upon the dry weight of the crosslinked starch, though water contents anywhere in the range of 5–18% would be considered operable. Below 5%, there is very little ether formation, and above 18%, starch degradation occurs rsulting in a decrease in yield.

The amount of catalyst will generally vary from about 0.017 to about 0.17 mole per mole of crosslinked starch AGU. Excess acid can result in charring of the starch and exothermic polymerization of the epihalohydrin, thereby reducing the yields of ether. The pH per se of the reaction mixture is not especially critical, but at the acid quantities set forth above, the pH will normally be in the range of 3–4. The etherification in the preparation of the HHCS in an addition reaction involving an acid catalyzed opening of the oxirane ring of the epihalohydrin as depicted below:

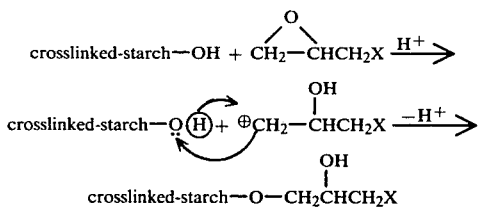

wherein X is chlorine, bromine, or iodine. The preferred reaction temperature is in the range of 100°–115° C. The etherification will proceed as low as 60° C., but it is slow and the yield of halohydrin product is substantially reduced. Above 115° C., the reaction progresses more rapidly, but its temperature must be kept below the boiling point of the epihalohydrin and the degradation point of the starch. Reaction time is also a function of the moisture content. The etherification rate is highest at moisture contents above 10%. By operating at temperatures of 100°–115° C. and moisture contents in the range of 5–18% based upon the dry weight of the starch, maximum yields of the HHCS would be obtained in approximately 2–12 hours.

The HHCS products prepared under the conditions described above are characterized by a high degree of substitution, which is defined herein to include all D.S. values greater than 0.1. Those products prepared under the preferred conditions have D.S.'s greater than about 0.7 and as high as about 1.0. These starch halohydrins may be recovered from the reaction media if desired. The unreacted starting materials and the byproducts, such as epihalohydrin homopolymer, can be removed by washing with water and acetone. Alternatively, if the HHCS is to be used as an intermediate in the preparation of nitrogen-containing starch ethers, the crude product can be reacted directly with the nitrogen reagent. Elimination of the intermediate purification step renders the overall process commercially advantageous over prior art processes of producing nitrogen-containing starch ethers.

The nitrogen reagents within the scope of this invention include all nitrogen-containing compounds which are sufficiently reactive to displace the halogen in the starch ether under basic conditions. These compounds fall into two general categories: 1) nitrogen functionality reactive; and 2) nitrogen functionality nonreactive. The first category comprises those compounds wherein the nitrogen functionality will directly displace the halogen on the HHCS. The most common are the primary, secondary, and tertiary amines represented by the general formula

wherein substituents $R^1$, $R^2$, and $R^3$ are each independently selected from the group of hydrogen, straight or branched alkyls, cyclics formed by the joining of two of said substituents, and aromatics. The alkyls, cyclics, and aromatics may be substituted with hydroxyls, carboxyls, sulfonates, or other simple substituents provided that they do not eliminate the reactivity of the amino group with the halogenated starch. Examples of compounds within this group are dimethylamine [$HN(CH_3)_2$], trimethyl amine [$N(CH_3)_3$], diethylamine [$HN(CH_2CH_3)_2$], triethylamine [$N(CH_2CH_3)_3$], nitrilotriacetic acid trisodium salt [$N(CH_2CO_2Na)_3$], 2-amino-2-(hydroxy-methyl)-1-3-propanediol, diethanol amine [$HN(CH_2CH_2OH)_2$], iminodiacetic acid disodium salt [$HN(CH_2CO_2Na)_2$], 2-amino-ethyl hydrogen sulfate sodium salt ($NH_2CH_2CH_2OSO_3Na$), and aniline ($H_2NC_6H_5$). Other nitrogen functionality reactive compounds are the multifunctional amines such as ethylenediamine ($NH_2CH_2CH_2NH_2$) and complex amines such as glucosamine ($C_6H_{13}NO_5$), N-methyl-D-glucamine ($C_7H_{15}NO_5$), and amino acids.

The second category of nitrogen-containing compounds includes those reagents bearing one or more nonnitrogen functional groupings which preferentially react with the HHCS halogen over the nitrogen functionality. Illustrative of these reagents are urea ($NH_2CONH_2$), thiourea ($NH_2CSNH_2$), and the like.

The proportion of nitrogen-containing reagent to starch halohydrin is a function of the desired D.S. in the final product. For complete substitution of the halogen, a stoichiometric molar ratio or slight excess is required. Of course, where the use of the final product permits a lower D.S., a lesser amount could be used. As an alternate embodiment, it is envisioned that a mixture of nitrogen reagents can be substituted for the halogen.

The substitution reaction is preferably conducted in a temperature range of about 60°–100° C. and at a pH in the range of 8–11. The inherent basicity of the nitrogen-containing reagent normally provides the proper pH, but it is understood that the pH can be adjusted with other agents as necessary. To facilitate product recovery, it is preferred that the reaction medium be a nonsolvent for the product. After completion of the reaction, the solid nitrogen-containing starch ether may then be recovered by filtering, washing, and drying. While not desiring to be bound to any particular theory of operation, it is believed that the mechanism of reaction probably occurs through an epoxide intermediate as follows:

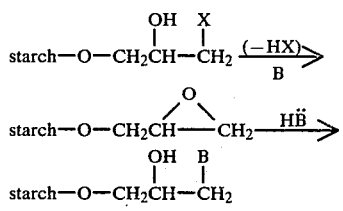

where B represents the nitrogen-containing compound.

By the above process, starch ethers may be tailored for use in a variety of industrial applications. Depending upon the nitrogen-containing moiety, the ethers may possess anionic, cationic, or chelating properties. Primary, secondary, and tertiary amines reacted with the HHCS yield secondary, tertiary, and quaternary ammonium products, respectively. For example, cationic tertiary amine starches are prepared from nitrogen reagents such as dimethylamine or diethylamine, and cationic quaternary ammonium starches can be made from nitrilotriacetic acid. Anionic starches are derived from nitrogen-containing reagents bearing an anionic group. For instance, a sulfonate moiety can be incorporated into the crosslinked starch of the invention by reaction of the HHCS intermediate with 2-aminoethyl halogen sulfate. Indicative of the agents useful in preparing chelating starches are iminodiacetic acid and nitrilotriacetic acid and their alkali metal salts, as well as diethanolamine and ethylenediamine. Nitrogen D.S.'s for the composition of the invention will generally be in the range of 0.1 to 1.0 and preferably in the range of 0.5–1.0.

The instant crosslinked cationic starches are generally useful for many of the same purposes as conventional cationic starches. By virtue of their insolubility and high D.S., they are particularly effective in the removal of chromate, ferrcyanide, molybdate, permanganate, and other anions from aqueous solution. Crosslinked anionic starches such as the above-mentioned sulfonate are advantageously employed in strong acid ion-exchange resins. The crosslinked chelating starches are effective in the removal of copper, cadmium, mercury, zinc, iron, and other heavy metal ions from aqueous solutions. It is envisioned that they will be particularly useful in purifying electroplating rinse waters.

The following examples are intended only to further illustrate the invention and are not intended to limit the scope of the invention which is defined by the claims.

EXAMPLES 1–3

Preparation of 3-Chloro-2-Hydroxypropyl-Crosslinked Starch 356 g. of highly crosslinked granular starch ("HPD-53-91E," 9.2% $H_2O$, crosslinked with epichlorohydrin, manufactured by the Hubinger Company, Keokuk, Iowa) and 627 ml. of epichlorohydrin were slurried together in a 3-liter round-bottomed flask equipped with a reflux condenser, stirrer, thermometer, and calcium chloride drying tube. After stirring for 5 min., 7.3 ml. of 60% perchloric acid was added and the slurry was refluxed at 100°–120° C. After the reaction was completed (6–8 hours), the slurry was allowed to cool and was filtered through Whatman No. 54 filter paper on a Büchner funnel. The solid was washed with 1500 ml. water and dehydrated with acetone. After drying at room temperature for 2 hours under vacuum, the product was analyzed. The results are given in Table IA. The chlorine D.S. for these and succeeding examples was calculated from the percent chlorine by the formula:

$$D.S._{Cl} = \frac{162\ (\%\ Cl)}{3{,}550 - 92.5\ (\%\ Cl)}$$

To determine the percent chlorine incorporated into the crosslinked starch with time, aliquots were taken from the reaction vessel of Example 3 each hour, washed with water and acetone, and the percent chlorine determined. The results are reported in Table IB.

TABLE IA

| Example | Crosslinked starch, g. | Epichlorohydrin, ml. | Epi.:starch molar ratio[1] | 60% perchloric acid (ml.) | Reaction time, hr. | Reaction temp., °C. | Yield, g. | % Cl, d.b. | D.S. Cl | Moisture, % |
|---|---|---|---|---|---|---|---|---|---|---|
| 1 | 356.5 | 627.3 | 4:1 | 7.3 | 6.0 | 100–120 | 403 | 7.02 | 0.39 | 4.88 |
| 2 | 356.5 | 627.3 | 4:1 | 7.3 | 7.0 | 100–120 | 440 | 12.29 | 0.83 | 4.44 |
| 3 | 356.5 | 627.3 | 4:1 | 7.3 | 8.0 | 100–120 | 256[2] | 8.21 | 0.48 | 8.61 |

[1]Molar ratio of epichlorohydrin:starch anhydroglucose unit.
[2]Aliquots were removed to determine % Cl at various time intervals; therefore, a low final yield.

TABLE IB

| Aliquot | Reaction time, hr. | % Cl, d.b. |
|---|---|---|
| A | 0 | 0 |
| B | 1 | 2.29 |
| C | 2 | 3.70 |
| D | 3 | 4.56 |
| E | 4 | 5.65 |
| F | 5 | 5.97 |
| G | 6 | 6.70 |
| H | 7 | 7.74 |
| I | 8 | 8.21 |

EXAMPLES 4–13

The procedure of Examples 1–3 was repeated, except that the proportions of reactants and conditions of etherification were varied as shown in Table II below.

EXAMPLES 14-18

The procedure of Examples 1-3 was repeated except that the moisture content in the crosslinked starch was varied as shown below in Table III. Moisture contents less than the original 9.2% were obtained by drying the starch in an air oven to the indicated amounts. Moisture contents greater than 9.2% were obtained by addition of distilled water.

EXAMPLE 19

Preparation of 3-Bromo-2-Hydroxypropyl-Crosslinked Starch 25 g. of the highly crosslinked granular starch used in Examples 1-3 and 52.8 ml. of epibromohydrin were slurried in a round-bottomed flask equipped with a reflux condenser, stirrer, and calcium chloride drying tube. After stirring for 5 min., 0.5 ml. of 60% perchloric acid was added and the slurry was refluxed for 4 hours at 105°-120° C. The slurry was allowed to cool and was filtered through Whatman No. 54 filter paper on a Büchner funnel. The solid was washed with 1500 ml. water and dehydrated with acetone. After drying under vacuum, the product was analyzed. Yield, 28.2 g.; Br, 9.09%.; D.S. Br, 0.22; and $H_2O$, 6.84%.

added and the temperature was varied from 60° C. to 100° C. The mixture was stirred throughout the reaction period ranging from 3.5 to 7.0 hours, and was then allowed to cool. The slurry was filtered through Whatman No. 54 filter paper on a Büchner funnel. The solid was washed with 1000 ml. water and then dehydrated with acetone. After drying for 2 hours under vacuum, the product was analyzed. The results are shown in Table IV.

EXAMPLES 31-32

The diethanolamine crosslinked starch (DACS) of Example 23 and the iminodiacetic acid crosslinked starch (IDACS) of Example 26 were evaluated for their effectiveness in heavy metal removal at various pH's. Because cupric ions normally precipitate from water at pH 5.3, copper complexes were used in the determination. 1000-ml. solutions of copper pyrophosphate (55 mg. Cu/liter), copper ammonia (50 mg. Cu/liter), and copper tartrate (62 mg. Cu/liter) were prepared and adjusted to the appropriate pH with 1 N NaOH or 1 N $H_2SO_4$. 0.5 g of diethanolamine crosslinked starch (1.96 meq. metal ion/g.) or iminodiacetic acid crosslinked starch (1.29 meq. metal ion/g.) was added and the pH was readjusted. Thirty min. after addition, aliquots

TABLE II

| Example | Crosslinked starch, g. | Epichlorohydrin, ml. | Epi.:starch molar ratio[1] | 60% perchloric acid (ml.) | Reaction time, hr. | Reaction temp., °C. | Yield, g. | % Cl, d.b. | D.S. Cl | Moisture, % |
|---|---|---|---|---|---|---|---|---|---|---|
| 4 | 35 | 100 | 6.5:1 | 0.3 | 4.0 | 100–120 | — | 0.52 | 0.024 | 12.82 |
| 5 | 35 | 100 | 6.5:1 | 0.5 | 4.0 | 100–120 | — | 2.23 | 0.108 | 8.76 |
| 6 | 35 | 100 | 6.5:1 | 0.7 | 4.0 | 100–120 | — | 4.21 | 0.216 | 8.71 |
| 7 | 35 | 100 | 6.5:1 | 1.0 | 4.0 | 100–120 | — | 7.94 | 0.457 | 7.73 |
| 8 | 35 | 100 | 6.5:1 | 1.2 | 4.0 | 100–120 | — | 8.61 | 0.507 | 8.70 |
| 9 | 35 | 100 | 6.5:1 | 2.0 | 4.0 | 80–90 | — | 2.59 | 0.127 | 6.02 |
| 10 | 35 | 100 | 6.5:1 | 5.0 | 20.0 | 60 | — | 2.36 | 0.115 | 6.44 |
| 11 | 105 | 300 | 6.5:1 | 3.5 | 8.0 | 100–120 | 134 | 14.77 | 1.096 | 9.36 |
| 12 | 290[2] | 500 | 3.9:1 | 5.8 | 3.5 | 100–120 | 366 | 11.42 | 0.742 | 8.03 |
| 13 | 356.5[3] | 627.3 | 4:1 | 7.3 | 4.5 | 100–120 | 447 | 10.91 | 0.696 | 9.80 |

[1]Molar ratio of epichlorohydrin:starch anhydroglucose unit.
[2]2 ml. water added.
[3]4 ml. water added.

TABLE III

| Example | Crosslinked starch, g. | Epichloro-hydrin, ml. | Epi.:starch molar ratio[1] | 60% perchloric acid (ml.) | Original starch moisture, % | Reaction time, hr. | Reaction temp., °C. | Yield, g. | % Cl, d.b. | D.S. Cl | Moisture, % |
|---|---|---|---|---|---|---|---|---|---|---|---|
| 14 | 45 | 88 | 4:1 | 1 | 0.5 | 4 | 100–120 | 48.0 | 0.59 | 0.027 | 11.15 |
| 15 | 45 | 88 | 4:1 | 1 | 2.6 | 4 | 100–120 | 49.0 | 0.83 | 0.039 | 12.79 |
| 16 | 45 | 88 | 4:1 | 1 | 9.2 | 4 | 100–120 | 56.0 | 11.36 | 0.736 | 7.46 |
| 17 | 45 | 88 | 4:1 | 1 | 15.0 | 3 | 100–120 | 60.5 | 13.13 | 0.911 | 7.19 |
| 18 | 45 | 88 | 4:1 | 1 | 20.0 | 2 | 100–120 | 42.0 | 13.59 | 0.960 | 6.36 |

[1]Molar ratio of epichlorohydrin:starch anhydroglucose unit.

EXAMPLES 20-30

Preparation of Nitrogen-Containing Starch Ethers 100 g. of 3-chloro-2-hydroxypropyl crosslinked starch was slurried in 400 ml. of water in a 1-liter round-bottomed flask equipped with thermometer, stirrer, and reflux condenser. The nitrogen-containing reagent was were removed and filtered through Whatman No. 54 filter paper. The residual metal concentrations were determined using a Varian Techtron AA 120 spectrophotometer. The results are reported in Table V. It is noted that the relatively high residual metal values were the result of employing less than stoichiometric amounts of starch chelate.

TABLE IV

| Ex. | Nitrogen-containing reagent | Weight, g. | Chlorinated starch product (Ex. No.) | Solvent | Solvent volume, ml. | Reaction temp., °C. | Reaction time, hr. | Yield, g. | % Cl, d.b. | Moisture, % | % N, d.b. | D.S. N[1] |
|---|---|---|---|---|---|---|---|---|---|---|---|---|
| 20 | $HN(CH_2CH_3)_2$ | 48.4 | 3 | $H_2O$ | 500 | 60–70 | 3.5 | 103 | 1.83 | 7.91 | 2.10 | 0.33 |

TABLE IV-continued

| Ex. | Nitrogen-containing reagent | Weight, g. | Chlorinated starch product (Ex. No.) | Solvent | Solvent volume, ml. | Reaction temp., °C. | Reaction time, hr. | Yield, g. | % Cl, d.b. | Moisture, % | % N, d.b. | D.S. N[1] |
|---|---|---|---|---|---|---|---|---|---|---|---|---|
| 21 | H$_2$NCH$_2$CH$_2$NH$_2$ | 36.4 | 12 | H$_2$O | 450 | 93 | 4.0 | 106 | 2.37 | 13.64 | 4.37 | 0.38 |
| 22 | NH$_4$OH | 51.0 | 12 | Ethanol +[2] | 150 | 70 | 6.0 | 50 | 1.96 | 12.09 | 1.91 | 0.30 |
| 23 | HN(CH$_2$CH$_2$OH)$_2$ | 63.9 | 12 | H$_2$O | 400 | 93 | 7.0 | 115 | 1.04 | 7.63 | 2.97 | 0.60 |
| 24 | H$_2$NCSNH$_2$ | 46.2 | 12 | Isopropanol | 350 | 85 | 6.0 | 107 | 6.53 | 6.26 | 4.70 | 0.51 |
| 25 | H$_2$NC(CH$_2$OH)$_3$ | 74.0 | 13 | H$_2$O | 400 | 93 | 6.0 | 116 | 5.56 | 9.42 | 2.50 | 0.53 |
| 26 | HN(CH$_2$CO$_2$Na)$_2$ | 88.0 | 13 | DMF[3] +[4] | 400 | 90 | 7.0 | 130 | 3.00 | 14.22 | 2.11 | 0.51 |
| 27 | HN(CH$_3$)$_2$ | 40.0 | 13 | H$_2$O | 270 | 70 | 6.0 | 112 | 3.19 | 10.72 | 3.38 | 0.57 |
| 28 | N(CH$_2$CO$_2$Na)$_3$ | 83.0 | 2 | DMF +[5] | 450 | 93 | 6.5 | 113 | 3.02 | 7.91 | 2.96 | 0.66 |
| 29 | NH$_2$CH$_2$CH$_2$OSO$_3$Na | 82.0 | 13 | H$_2$O | 400 | 95 | 6.0 | 109 | 3.14 | 10.18 | 2.55 | 0.55 |
| 30 | C$_7$H$_{15}$NO$_5$ | 51.4 | 13[6] | DMF[3] | 250 | 90 | 3.0 | 62 | 4.16 | 8.20 | 1.63 | 0.31 |

[1] D.S. based on Cl:N ratio and weight gain of final product.
[2] CH$_3$O Na (10 g.) added to reaction slurry (50 g. chloro-starch).
[3] DMF = dimethylformamide.
[4] NaOH (20 g.) dissolved in H$_2$O (50 ml.) added to reaction slurry.
[5] NaOH (20 g.) dissolved in H$_2$O (30 ml.) added to reaction slurry.
[6] 50 g. starting material.

TABLE V

| Example | Chelating starch[1] | Copper solution | Initial conc. (mg. Cu/l.) | Final conc. (mg. Cu/l.) pH 4 | 5 | 6 | 7 | 8 | 9 | 10 |
|---|---|---|---|---|---|---|---|---|---|---|
| 31A | DACS | pyrophosphate | 55 | 37.0 | 34.7 | 35.6 | 36.5 | 44.0 | 36.0 | 33.0 |
| 31B | DACS | ammonia | 50 | 46.0 | 43.0 | 34.1 | 8.1 | 18.2 | 25.1 | 16.1 |
| 31C | DACS | tartrate | 62 | 54.0 | 24.8 | 5.8 | 4.2 | 14.0 | 42.9 | 38.3 |
| 32A | IDACS | pyrophosphate | 55 | 21.0 | 18.0 | 23.8 | 26.0 | 29.0 | 30.0 | 25.0 |
| 32B | IDACS | ammonia | 50 | 21.5 | 21.9 | 19.4 | 16.1 | 17.7 | 16.7 | 4.0 |
| 32C | IDACS | tartrate | 62 | 22.9 | 20.9 | 24.0 | 23.6 | 23.2 | 30.4 | 27.6 |

[1] DACS = diethanolamine crosslinked starch.
[2] IDACS = iminodiacetic acid crosslinked starch.

EXAMPLES 33-34

1000-ml. solutions of copper complexes were prepared as described for Examples 31 and 32. The pH's were adjusted with 1 N NaOH or 1 N H$_2$SO$_4$ to approximately the optimum values for copper removal as determined from the data in Table V. DACS or IDACS was then added in 0.25-g. increments up to 1.00 g., and then a 0.5-g. increment was added. After each addition, the pH was readjusted and stirred for a total of about 30 min. Prior to each addition, aliquots were removed and filtered for copper analysis. The results are shown in Table VI.

EXAMPLES 35-36

The procedure of Examples 31 and 32 was repeated except that cadmium carbonate solutions (56 mg. Cd/liter) were substituted for the copper solutions. The results are shown in Table VII.

It is understood that the foregoing detailed description is given merely by way of illustration and that modification and variations may be made therein without departing from the spirit and scope of the invention.

TABLE VI

| Example | Chelating starch[1] | Copper solution | pH | Initial conc. (mg. Cu/l.) | Final cons. (mg. Cu/l.) Chelating starch addition (g.) 0 | 0.25 | 0.50 | 0.75 | 1.00 | 1.5 |
|---|---|---|---|---|---|---|---|---|---|---|
| 33A | DACS | pyrophosphate | 7 | 58 | 58.00 | 51.00 | 39.10 | 30.20 | 27.20 | 12.10 |
| 33B | DACS | ammonia | 7 | 53 | 53.00 | 33.80 | 16.90 | 7.50 | 3.05 | 1.30 |
| 33C | DACS | tartrate | 7 | 64 | 64.00 | 22.00 | 3.90 | 0.63 | 0.21 | 0.13 |
| 34A | IDACS | pyrophosphate | 5 | 58 | 58.00 | 45.20 | 28.80 | 9.18 | 0.86 | 0.12 |
| 34B | IDACS | ammonia | 9 | 55 | 52.80 | 38.80 | 22.80 | 7.80 | 0.68 | 0.12 |
| 34C | IDACS | tartrate | 5 | 64 | 64.00 | 42.00 | 23.10 | 8.80 | 0.28 | 0.12 |

[1] DACS = diethanolamine.
IDACS = iminodiacetic acid crosslinked starch.

TABLE VII

| Example | Chelating starch[1] | Cadmium solution | Initial conc. (mg. Cd/l.) | Final conc. (mg. Cd/l.) pH 4 | 5 | 6 | 7 | 8 | 9 |
|---|---|---|---|---|---|---|---|---|---|
| 35 | DACS | carbonate | 56 | 53.50 | 53.30 | 53.10 | 53.50 | 48.70 | 26.50 |
| 36 | IDACS | carbonate | 56 | 1.80 | 0.69 | 0.22 | 0.10 | 0.10 | 0.10 |

[1] DACS = diethanolamine crosslinked starch.
IDACS = iminodiacetic acid crosslinked starch.

We claim:

1. A water-insoluble, 3-halo-2-hydroxypropyl ether of ungelatinized crosslinked starch having a degree of substitution of said ether of at least 0.1.

2. The product as described in claim 1 wherein the halogen in the ether substituent is chlorine.

3. The product as described in claim 1 wherein said degree of substitution is at least 0.7.

4. A method of preparing a water-insoluble 3-halo-2 hydroxypropyl ether of ungelatinized crosslinked starch having a degree of substitution of said ether of at least 0.1 comprising the step of reacting a granular, crosslinked starch having a moisture content of 5–18% based upon its dry weight with a sufficient amount of an epihalohydrin in the presence of a strong acid catalyst.

5. The method as described in claim 4 wherein said epihalohydrin is epichlorohydrin.

6. The method as described in claim 4 wherein the molar ratio of epihalohydrin:starch anhydroglucose unit is in the range of about 3:1 to about 6:1.

7. The method as described in claim 4 wherein said strong acid catalyst is perchloric acid.

8. A water-insoluble reaction product of a nitrogen-containing compound and a 3-halo-2-hydroxypropyl ether of ungelatinized crosslinked starch having a degree of substitution of said ether of at least 0.1, wherein said nitrogen-containing compound is reacted at the site of halogenation.

9. The product as described in claim 8 wherein the degree of substitution of said compound is at least 0.5.

10. A method of preparing a water-insoluble, ungelatinized, nitrogen-containing starch ether characterized by a high degree of substitution comprising the following steps:
   a. reacting a granular, crosslinked starch having a moisture content of 5–18% based upon its dry weight with an epihalohydrin in the presence of a strong acid catalyst in order to produce the 3-halo-2-hydroxypropyl ether;
   b. reacting the ether prepared in step (a) with a nitrogen-containing compound, wherein said nitrogen-containing compound is reacted at the site of halogenation in order to produce said nitrogen-containing starch ether; and
   c. recovering the nitrogen-containing starch ether prepared in step (b).

11. The method as described in claim 11 wherein the molar ratio of epihalohydrin:starch anhydroglucose unit is in the range of about 3:1 to about 6:1.

12. The method as described in claim 11 wherein the degree of substitution of said nitrogen-containing compound in said starch ether is at least 0.1.

13. The method as described in claim 11 wherein the degree of substitution of said nitrogen-containing compound in said starch ether is at least 0.5.

* * * * *